J. P. CONSTABLE, C. G. MICHALIS AND E. McGALL.
PRIMARY OR VOLTAIC BATTERY OR CELL.
APPLICATION FILED OCT. 6, 1917.

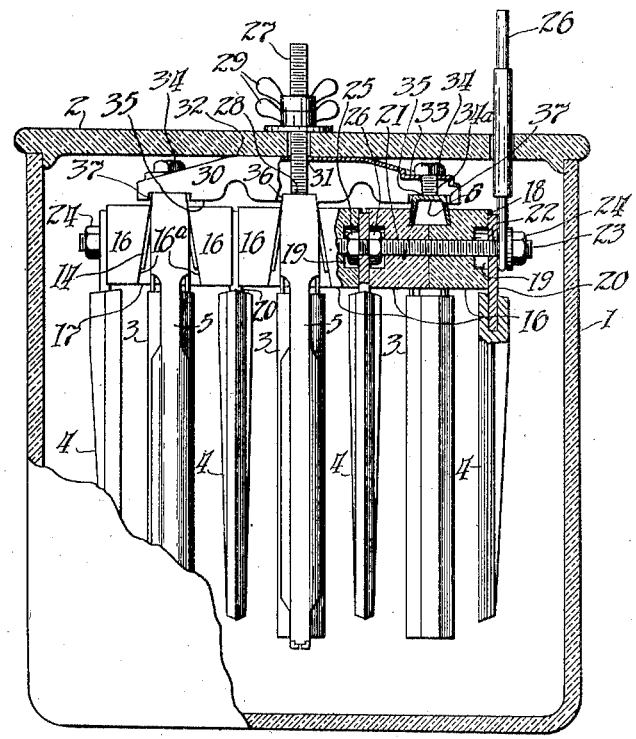
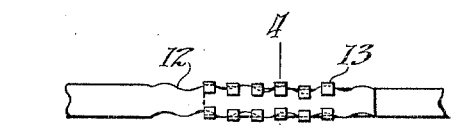
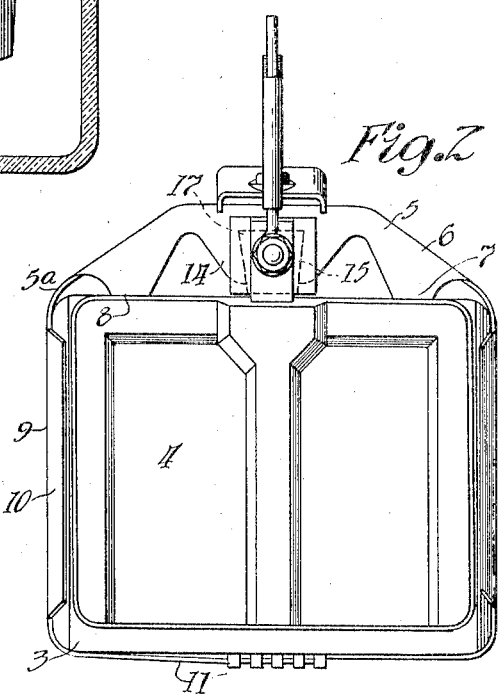

1,334,946.   Patented Mar. 30, 1920.
2 SHEETS—SHEET 2.

Witnesses:
N. L. Fisher
Chas. H. Kesler

Inventors:
John P. Constable
Clarence G. Michalis
Edward McGall
by Delos Holden
Their Atty.

UNITED STATES PATENT OFFICE.

JOHN P. CONSTABLE AND CLARENCE G. MICHALIS, OF WEST ORANGE, AND EDWARD McGALL, OF ORANGE, NEW JERSEY, ASSIGNORS TO NEW JERSEY PATENT COMPANY, OF WEST ORANGE, NEW JERSEY, A CORPORATION OF NEW JERSEY.

PRIMARY OR VOLTAIC BATTERY OR CELL.

1,334,946.    Specification of Letters Patent.    Patented Mar. 30, 1920.

Application filed October 6, 1917. Serial No. 195,043.

*To all whom it may concern:*

Be it known that we, JOHN P. CONSTABLE, a citizen of the United States, and a resident of West Orange, in the county of Essex and State of New Jersey, CLARENCE G. MICHALIS, a citizen of the United States, and a resident of West Orange, in the county of Essex and State of New Jersey, and EDWARD McGALL, a citizen of the United States, and a resident of Orange, in the county of Essex and State of New Jersey, have invented certain new and useful Improvements in Primary or Voltaic Batteries or Cells, of which the following is a description.

Our invention relates to primary or voltaic batteries or cells and more particularly that class of batteries in which the negative electrode consists of a plate or plates of oxid of copper, or other depolarizing agent, properly molded or agglomerated and provided with a conductive frame or frames and the positive electrode consists of a plate or plates of zinc attached to the frame or frames and in which both the positive and negative electrodes and their frames are supported from the battery jar by a single suspension means such as a rod or bolt whereby the electrodes and their frame or frames may be easily removed as a unitary structure for any desirable purpose such as cleaning or renewing.

An object of the present invention is to improve the construction of the frame so that it can be easily and quickly clamped and rigidly secured, by machinery if so desired, to the negative electrode or plate whereby a good electrical contact between the electrode or plate and frame is insured.

Another object of the invention is to provide a supporting structure for the plates which is simple and cheap, yet rigid, and in which the liability of contact between the positive and negative electrodes or plates and consequent shortcircuiting is materially decreased.

Another object of the invention is to provide a compact and simple supporting structure which permits the electrodes or plates to be placed close to the top of the jar, thereby affording in any particular jar more space below the electrodes so that the latter will be maintained out of the concentrated inactive electrolyte which accumulates in the bottom of the jar.

Our invention consists further in details of construction and combination of parts hereinafter more particularly described and claimed.

In the accompanying drawings which form a part of this specification and in which like reference characters refer to like parts in the several views—

Figure 1 is an elevation of a cell with parts broken away and with parts in sections.

Fig. 2 is an elevation of the cell without the jar and looking at the same in a direction at right angles to that shown in Fig. 1.

Fig. 3 is a detail view of the fastening and locking means for securing the electrode within the frame.

Fig. 4 is a section of the same on the line 4—4 of Fig. 3.

Figure 5:
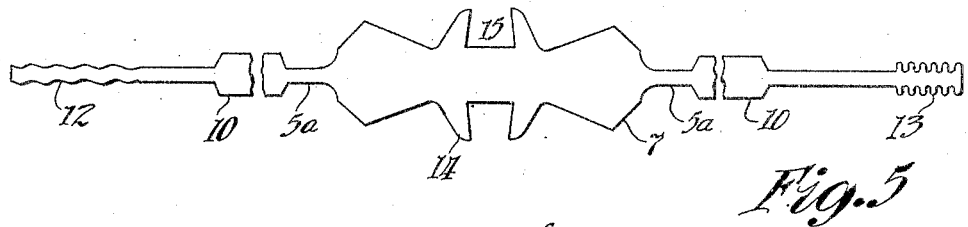
Fig. 5 is a plan view of the frame as stamped out.

As illustrated in Fig. 1 a jar 1 is provided with a cover 2. The negative electrodes or plates 3, preferably consisting of copper oxid, and the positive electrodes or plates 4 preferably consisting of amalgamated zinc are provided and alternate with each other.

A conductive frame or inclosing member 5 of sheet metal coated with copper or of copper surrounds each negative electrode. This frame, as shown more clearly in Figs. 2, 5 and 6, comprises a channel-shaped top or portion 6, having downwardly or in-inwardly extending substantially parallel flanges, lugs or lips 7 having inner edges adapted to bear against the intermediate portions of the upper edge of the plate or electrode as indicated at 8. The sides 9 of the frame extend downwardly and are provided with flanges 10 which are closely clamped around the lateral edges of the electrode or plate which are preferably beveled. The frame 5 at the corners is devoid of flanges as indicated at 5ª so that it can be easily bent and secured to the electrode. The frame then extends along the bottom as indicated at 11 and comprises flexible straps with the ends connected together or interlocked.

The upper edge of the top 6 is substantially horizontal at the center, inclines at the proper angle downwardly at its ends toward the upper corners of the electrode, terminates at points thereabove, inwardly therefrom and above the points of contact 8 of the top 6 with the electrode and merges with the flexible portions 5ª which form continuations thereof whereby when the straps 11 are drawn up and secured the sides 9 are clamped to the electrode with the best effect and the lips 7 are drawn against the upper edge of the electrode securely holding the latter within the frame.

The manner in which the ends are connected together is more clearly illustrated in Fig. 3. It will be there seen that the ends overlap, one end of the frame being provided with indented or wavy edges as indicated at 12, while the edges of the opposite end are provided with lugs or tongues 13 which overlap or are folded over the first end and engage the edges thereof in the troughs or between the projections. From an inspection of Fig. 5 it will be seen that the indented or wavy edges 12 extend for a greater distance along their end than the tongues do along their end and that the tongues are more numerous and smaller than the indentations or waves. By this construction the frames can be quickly and securely fastened around electrodes of different sizes and at least some of the tongues will engage some of the indentations or troughs to retain the frame in position and fastened. It will, therefore, be seen that the frame is securely clamped or attached to its electrode so that danger of the ends moving longitudinally relatively to each other and of becoming detached is obviated.

Figure 6:
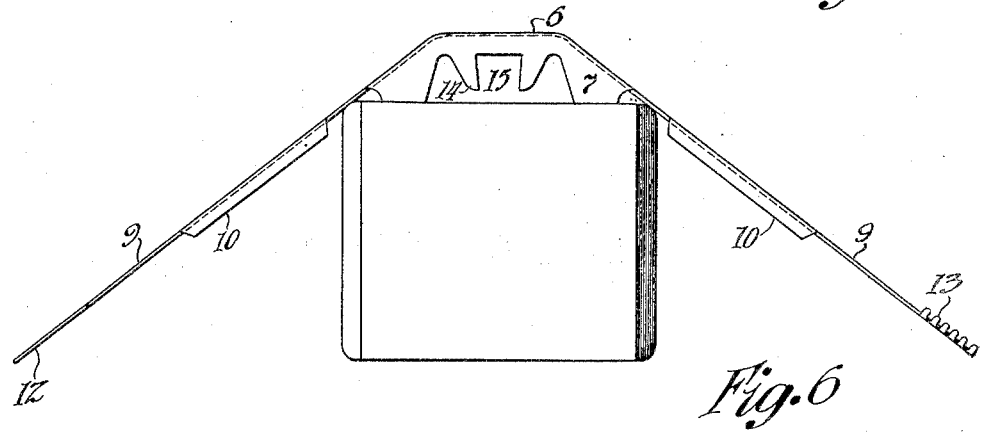
Fig. 6 is an elevation of the same with the parts in position to be placed around the electrode.

As shown in Fig. 5, the frame 5 is stamped from sheet metal forming a blank having projecting portions to form the lugs 7, flanges 10 and insulating block receiving lips 14, reduced portions 5ª being provided so that the blank may be easily bent. The construction of the blank is such that it can be easily clamped around the electrode by machinery, the projecting portions being first bent up as shown in Fig. 6. The frame will fit the electrode very closely and is clamped to the same to insure perfect contact between the two. The central portion of the frame 5 is provided with the diverging resilient ears or lips 14 which have wedge-shaped openings or slots 15 tapering downwardly as shown in Fig. 2 and terminating short of the electrode 3.

Inserted into said slots at opposite sides of each frame are a number of insulating blocks 16. These insulating blocks are provided upon adjacent faces 16ª with lugs 17 tapering downwardly which fit into the tapered slots 15 and abut. It should be noticed that the smaller portions of the lugs are at the lower ends, whereby the insulating blocks are held securely within the frames, supported thereby independently of the electrodes 3 and in spaced relation thereto so that the rigid construction may be maintained irrespective of variations in the sizes of the insulators and electrodes used and prevented from dropping down. The adjacent faces 16ª at each side of the lugs 17 are inclined and diverge downwardly fitting against the diverging ears 14, whereby they are additionally supported against downward movement. The blocks 16 are made preferably of glass so that they may be accurately formed true to dimensions, and short circuits may be easily detected by reason of their transparency. Each insulating block upon one face thereof and upon the face remote from the lug is provided with a transverse groove 18. Extending inwardly centrally of the block and from the groove is a recess 19. Each of the positive electrodes is provided at its upper end with hanger or shank 20 which fits within a groove 18. It should be noticed, in looking at Fig. 1, that in the intermediate insulating blocks the grooves 18 face each other and that the intermediate positive electrodes are clamped between the blocks and located within these grooves. Each block is provided with a central opening 21, and the openings 21 of the several blocks are in alinement with each other and with the recesses 19. Extending through the openings 21 and through openings 22 upon the hangers is a threaded rod 23. The outer ends of the rod 23 are provided with nuts 24 which clamp the outer electrodes securely against the adjacent insulating blocks and draw the blocks up together. Each intermediate positive electrode is secured in position upon the rod 23 by means of a pair of nuts 25 and 26 located upon the rod and arranged upon opposite sides of the hanger or shank. This arrangement provides a secure electrical contact between the rod 23 and the positive electrode, and it should also be noticed that the nuts are located within the adjacent recesses 19 where they are amply protected. The rod 23 constitutes a conductor for the positive electrodes and from it extends a suitable lead 26. The grooves 18 prevent the rotation of the positive electrodes around the rod 23.

In the construction here shown, a threaded attaching rod or stem 27 is butt-welded at its lower end to the central upper portion of the middle frame 5, as indicated at 28. This stem 27 is provided with butterfly nuts 29 upon the outside of the cover 2 through which the stem extends, whereby the device can be suspended therefrom. A channel-shaped yoke or bridge 30 is interposed between the cover and the frames and is provided with a suitable opening 31 through which the stem 27 extends. This yoke is provided with a central flat portion 32 upon one side adapted to fit flat against the bottom of the cover 2 and is provided at its ends, which are spaced below the central portion of the yoke away from the cover, upon the same side with seats 33 with which the nuts 34 of stems 34ª engage. The stems 34ª are welded at their lower ends to the outer frames 5 which are detachably clamped to the yoke. The edges 35 of the flanges of the yoke are provided with centrally located tapered recesses 36 in which the central portion of the middle frame 5 closely fits, making a good electrical contact. The outer portions of the edges of the flanges are likewise provided with recesses 37 into which the central portions of the outer frames project, the nuts 34 clamping the same thereto. It should be noticed in this connection, however, that the outer recesses are wider than these outer frames whereby the yoke is adapted for use even where slight variations in the transverse width of the assembly exists. By screwing up the butterfly nuts 29 it will be seen that the yoke will be secured between the cover and the several frames embracing the negative electrodes and will hold them spaced from the cover. The negative electrodes, frames, yoke and attaching stem 27 are all electrically connected and constitute part of the cell circuit.

Figure 7:
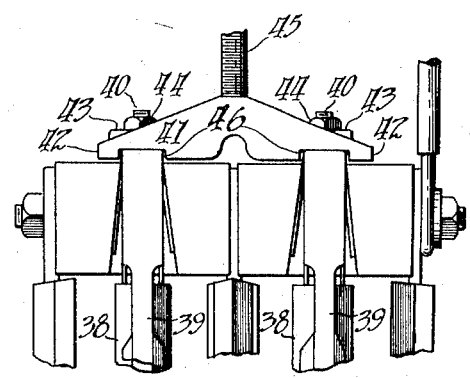
Fig. 7 is an elevation with parts omitted of another form of cell.

It is to be understood that the invention is applicable to single unit and double unit constructions or to constructions of any number of units. In double unit constructions as shown in Fig. 7 the two negative electrodes 38 are provided with frames 39 of the construction described above. To the upper central portion of each frame is welded a threaded stem 40. A channel yoke 41, which tapers toward its ends 42, is provided with seats 43 through which the stems 40 project. The seats 43 form supports for nuts 44 which securely clamp the frames to the yoke and which are threaded upon the stems 40. A threaded attaching stem 45 is welded to the central portion of the yoke and serves for attaching the units to the cover. The edges of the yoke are provided with recesses 46 wider than the frames into which the frames extend to securely hold the same in electrical contact with the yoke and spaced below the cover.

Figure 8:
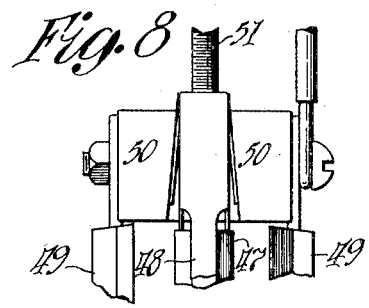
Fig. 8 is an elevation with parts omitted of a further form of cell.

In single unit constructions as shown in Fig. 8 the negative electrode 47 is provided with a frame 48 of a construction described above to which are attached the positive electrodes 49 and insulating blocks 50. An attaching stem 51 is welded directly to the frame 48 as in the form shown in Fig. 1, the yoke being omitted.

An advantage of the above described construction resides in the fact that the parts can be more easily and quickly assembled and disassembled for repairs, etc., than constructions now in use. The parts have also been simplified and greatly reduced in number, making the cell less expensive. The whole construction is compact and rigid as will be seen, and the upper ends of the electrodes can be located close to the cover 2.

It is to be understood that our invention is not limited to the embodiments and features specifically shown and described herein but that such features and embodiments are subject to changes and modifications without any departure from the spirit of the invention.

Having now described our invention what we claim as new and desire to protect by Letters Patent of the United States is as follows:—

1. In a voltaic cell, the combination with an electrode thereof, of a frame comprising a relatively rigid top adapted to bear against the upper edge of the electrode, sides engaging the lateral edges of the electrode and flexibly connected to said top and means extending beneath the electrode and connected together to draw the top and sides of the frame against the electrode and to support the electrode therein, substantially as described.

2. In a voltaic cell, the combination with an electrode thereof, of a frame comprising a top bearing against the electrode, sides flexibly connected to said top at points spaced inwardly of and above the upper corners of the electrode and means extending beneath the electrode for drawing the top and sides against the electrode, substantially as described.

3. In a voltaic cell, the combination with an electrode thereof, of a frame attached to said electrode and comprising a top provided with a lower portion bearing against the electrode and an upper edge inclined downwardly toward the upper corners of the electrode, sides continuing said inclined edge, bent around the corners and engaging the lateral edges of the electrode and means for securing the top and sides to said electrode, substantially as described.

4. In a voltaic cell, the combination with an electrode thereof, of a frame attached to said electrode and comprising a channel-shaped top with inwardly extending flanges having lower edges bearing against the upper edge of the electrode and with an upper edge inclined downwardly toward the upper corners of the electrode, flanged sides engaging the lateral edges of the electrode, flexibly connected to said top at points spaced inwardly of and above the upper corners of the electrode and constituting continuations of said upper edge of said top and straps extending beneath the electrode and connected together to draw the top and sides of the frame against the electrode, substantially as described.

5. In a voltaic cell, the combination with an electrode thereof, of a frame attached to said electrode and comprising a channel-shaped top with inwardly extending flanges having edges bearing against the edge of said electrode, substantially as described.

6. In a voltaic cell, the combination with an electrode thereof, of a supporting frame for said electrode comprising a top above the upper edge of the electrode and adapted to bear against the same and an insulator supported by and secured in said top at a point above the upper edge of said electrode, substantially as described.

7. In a voltaic cell, the combination with an electrode thereof, of a supporting frame for said electrode comprising a top bearing against said electrode at spaced points and having a portion above the upper edge of the electrode provided with an insulator-receiving opening and an insulator supported by said top and secured in said opening whereby said insulator is supported by said top at a point above the upper edge of the electrode, substantially as described.

8. In a voltaic cell, the combination with an electrode thereof, of a frame attached to said electrode and comprising a channel-shaped top with inwardly extending flanges having edges bearing against the edge of the electrode and an insulator supported by said top, substantially as described.

9. In a voltaic cell, the combination with an electrode thereof, of a frame attached thereto and comprising a channel-shaped top with inwardly extending flanges having edges bearing against the edge of said electrode and with an insulator-receiving portion spaced from the adjacent edge of said electrode and an insulator supported by said top and secured in said portion, substantially as described.

10. In a voltaic cell, the combination with an electrode thereof, of a frame attached thereto and comprising a channel-shaped top with inwardly extending flanges having edges bearing against the edge of said electrode, with tapered slots intermediate said flanges in spaced relation to said electrode and facing the same and with an upper edge inclined downwardly toward the corners of the electrode and terminating at points spaced above and inwardly of said corners, sides constituting continuations of said upper edge and flexibly connected thereto, straps extending beneath the electrode and connected together to draw the top and sides of the frame against the electrode and insulators supported by said frame and secured in said slots in spaced relation to said electrode, substantially as described.

11. In a voltaic cell, the combination with one of the electrodes thereof, of a frame having an end provided with indented edges and an end provided with tongues, the number of tongues per unit length differing from the number of indentations per unit length, said indentations and tongues being interlocked to secure the frame to the electrode, substantially as described.

12. In a voltaic cell, the combination with one of the electrodes thereof, of a frame having an end provided with indented or wavy edges and an end provided with tongues, the length of the wavy or indented portion being greater than the length of the tongue portion, and the number of tongues per unit length exceeding the number of waves or indentations per unit length, substantially as described.

13. The combination with a plurality of electrodes of members constituting frames in which certain of said electrodes are supported and to which the other of said electrodes are attached, insulating means for said electrodes, a channeled member constituting a yoke connecting said frames, and an attaching stem secured to one of said members, substantially as described.

14. In a voltaic cell, the combination with a plurality of electrodes, of frames for certain of said electrodes, a channeled yoke having ends spaced below the central portion thereof to which the frames are attached, and means for supporting the frames and yoke in the cell jar, substantially as described.

15. In a voltaic cell, the combination with a plurality of electrodes, of frames for certain of said electrodes, a yoke having ends spaced below the central portion thereof, means for clamping the frames to the ends of said yoke, and means for supporting the frames and yoke from the cell cover with the central portion of said yoke in engagement with the cover, and the frames spaced slightly below the same, substantially as described.

16. In a voltaic cell, the combination with a plurality of electrodes, of supporting means therefor including frames for certain of said electrodes, a yoke having sides with lower portions coöperating with the frames and means for securing the yoke and frames together, substantially as described.

17. In a voltaic cell, the combination with a plurality of electrodes, of supporting means therefor including frames for certain of said electrodes, a yoke provided with recesses to receive portions of the frames and means for securing the yoke and frames together, substantially as described.

18. In a voltaic cell, the combination with a plurality of electrodes, of frames for certain of said electrodes, a channeled yoke having ends spaced below the central portion thereof and provided with seats and a bolt and nut connection between said frames and said yoke with the nuts engaging said seats, substantially as described.

19. In a voltaic cell, the combination with a plurality of electrodes, of frames for certain of said electrodes, a channeled yoke having ends spaced below the central portion thereof and provided with seats at the top and with recesses at the bottom receiving the upper portions of said frames, a bolt and nut connection clamping the frames to the yoke with the nuts engaging the seats, and means for connecting said frames and yoke to the cell cover with the central portion of the yoke in engagement with the cover, substantially as described.

20. In a voltaic cell, the combination with the electrodes thereof, of a frame comprising a central channel portion having lips engaging the top of one of the electrodes and tapered openings, the said channeled portion at each side of said openings diverging downwardly, flanged portions on said frame engaging and wedged against the opposite sides of the electrode, and means for fastening the ends of said frame at the bottom of the electrode, insulating blocks inserted in said tapered opening and provided with inclined faces engaging the downwardly diverging portions of said frame whereby the insulating blocks are retained in position, electrodes attached to said blocks, a rod extending through said blocks and last mentioned electrodes for securing them together, and means for suspending said electrodes and frame from the cover of the cell, substantially as described.

21. The combination with a plurality of frames supporting positive and negative electrodes and a jar therefor, of a yoke provided with a central recess into which one of said frames snugly and tightly fits and upon its ends with recesses into which the remaining of said frames extend to allow transverse adjustment, said frames being clamped to said yoke, and means for securing said frames and yoke within the jar, substantially is described.

JOHN P. CONSTABLE.
CLARENCE G. MICHALIS.
EDWARD McGALL.